Oct. 7, 1952 L. L. SALFISBERG 2,612,738
METHOD OF AND MACHINE FOR MAKING AND FILLING
PACKAGES FOR FLUENT SUBSTANCES
Filed May 21, 1948 7 Sheets-Sheet 2

INVENTOR.
Leroy L. Salfisberg,
BY Harry W. Cook,
ATTORNEY

Oct. 7, 1952         L. L. SALFISBERG        2,612,738
METHOD OF AND MACHINE FOR MAKING AND FILLING
PACKAGES FOR FLUENT SUBSTANCES
Filed May 21, 1948        7 Sheets-Sheet 5

Patented Oct. 7, 1952

2,612,738

UNITED STATES PATENT OFFICE 2,612,738

METHOD OF AND MACHINE FOR MAKING AND FILLING PACKAGES FOR FLUENT SUBSTANCES

Leroy L. Salfisberg, South Orange, N. J., assignor to Ivers-Lee Company, Newark, N. J., a corporation of Delaware Application May 21, 1948, Serial No. 28,495

14 Claims. (Cl. 53—10)

This invention relates in general to machines for making and filling packages in a continuous operation, especially packages for fluent substance, such as powder, granules, paste or liquid. More particularly, the invention contemplates the formation of packages from a preformed tube of packaging material which may be either seamless or made of two strips or layers of packaging material sealed together along longitudinal marginal zones. It is especially desirable that the packaging material be thin, flexible and heat-sealable, and preferably material that is itself softenable or fusible under heat, for example, rubber hydrochloride which is commonly called "Pliofilm," or polyvinyl chloride, known as "Koroseal."

A prime object of the invention is to provide a novel and improved method and machine for making and filling packages wherein a tube of the packaging material automatically shall be sealed or closed in a transverse zone and slit or scored in spaced relation to the sealed zone and thereafter flexed or deformed so as to provide an opening at the slit or score in the walls of the tube above said transverse zone through which the material to be packaged is deposited, whereafter the walls of the tube shall be sealed together adjacent said opening to complete a package.

Another object of the invention is to provide a novel and improved method and apparatus for slitting and separating the walls of the tube of packaging material.

Other objects are to provide a machine of this character which shall embody novel and improved features of construction whereby packages may be formed and filled in rapid succession with a minimum of attention from the operator, and to obtain other advantages and results that will be brought out by the following description in conjunction with the accompanying drawings, in which.

For the purpose of illustrating the principles of the invention and referring particularly to Figures 1-5, inclusive, I have shown the machine schematically as including a suitable frame or support plate 1 on which is a stud 2 for revolubly supporting a reel or spool 3 on which is wound a continuous tube 4 of packaging material. This tube may be formed in any suitable manner, but, as shown, is seamless and has longitudinal folds 5 forming in effect gussets which connect opposed approximately flat side walls 6. Preferably, the tube is formed of a heat-sealable material and most desirably material which is itself softenable or fusible under heat, for example, rubber hydrochloride or polyvinyl chloride, otherwise known as "Pliofilm" and "Koroseal," respectively.

Figures 1, 2:
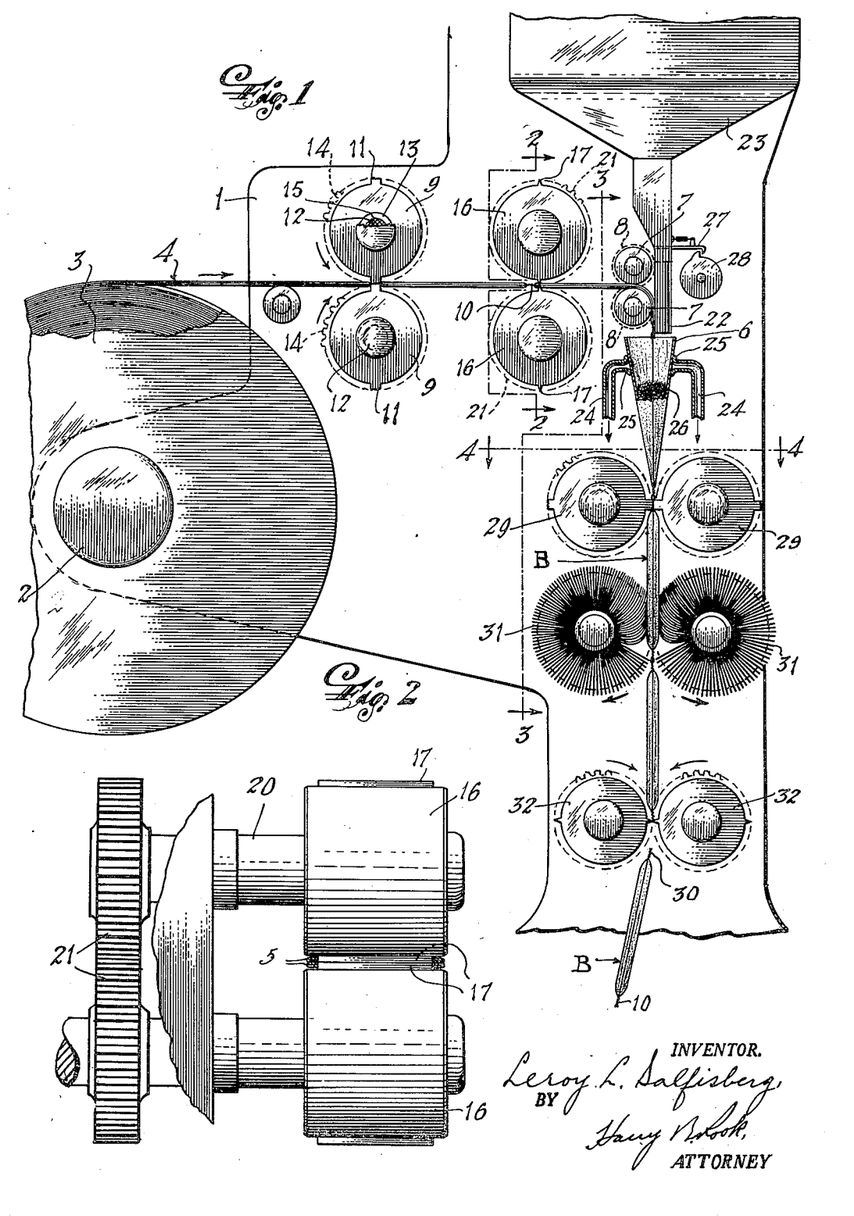
Figure 1 is a schematic front elevational view of a machine embodying the invention for making and filling packages.
Figure 2 is an enlarged transverse vertical sectional view, approximately on the plane of the line 2—2 of Figure 1.
Figure 3:
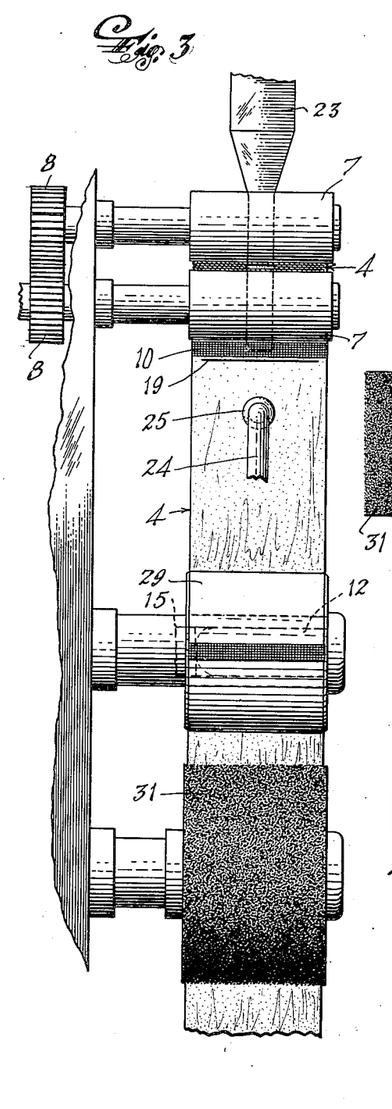
Figure 3 is a similar view, approximately on the plane of the line 3—3 of Figure 1.
Figure 4:
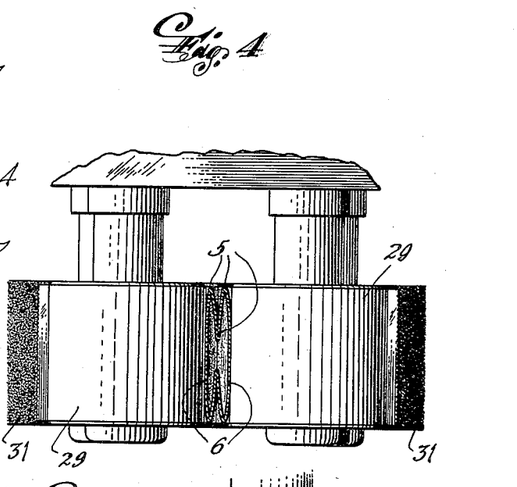
Figure 4 is an enlarged horizontal sectional view, on the plane of the line 4—4 of Figure 1.

The tube of packaging material is fed either intermittently or continuously, as desired, in the direction indicated by the arrow, by feed rolls 7 that are driven by any suitable means such as intermeshing gears 8 connected to the feed rolls and driven from any suitable source of power, not shown. These feed rolls pull the tube 4 from the spool 3, as shown in Figure 1, and between the reel and the feed rolls the side walls of the tube are sealed together by sealing and crimping rolls 9 in transverse zones 10 that are spaced equidistantly longitudinally of the tube. As shown, the rolls 9 have cooperating crimping and sealing ribs 11 that extend longitudinally of the rolls and across the whole width of the tube, and suitable means such as electrical heaters 12 are disposed within the rolls for heating the latter to heat-seal the walls of the tube. As shown, the rolls are mounted on shafts 13 journaled in the frame 1 and driven by any suitable means such as intermeshing gears 14 one of which may be driven from any suitable source of power. At least portions of the shafts 13 within the rolls have coaxial recesses 15 in which the heaters are located.

Figure 5:
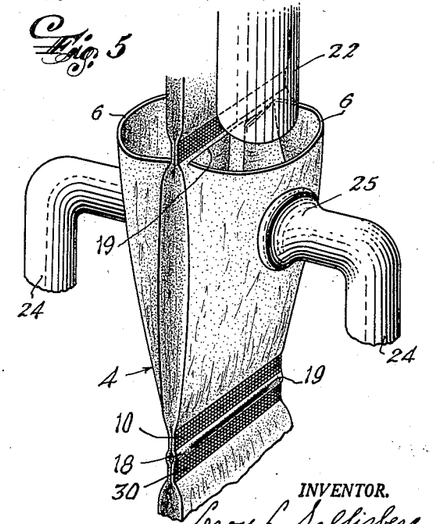
Figure 5 is an enlarged fragmentary perspective view of a portion of the tube of packaging material, the means for separating the layers of the tube and the spout for depositing the material to be packaged, showing the manner of filling a package.

It will be understood that the crimped zones 10 will be spaced apart according to the desired length of the package to be formed, each zone forming one end of a package, and between the crimp roll 9 and the feed roll 7 are arranged slitting rolls 16 having cooperating knives 17 to slit both walls 6 of the tube 4 at the leading side of and closely adjacent to each sealed zone 10, as best shown in Figure 1, the knives 17 extending across only a portion of the width of the tube so that uncut portions 18 are left between the ends of the slit 19 and the longitudinal edges of the tube, as best shown in Figure 5. These slitting rolls 16 may be mounted and driven in any suitable manner, for example, by shafts 20 journaled in the frame 1 and driven by intermeshing gears 21 one of which is connected to any suitable source of power.

From the feed rolls 7, the slitted portion of the tube is guided downwardly alongside and closely adjacent a filling spout 22 of a hopper 23 which contains the substance to be packaged. Below the mouth or discharge end of the spout 22 and at opposite sides of the path of movement of the tube 4, are located two vacuum tubes 24 that have opposed nozzles 25 and are connected to a suitable suction-producing apparatus so as to cause or produce suction at said nozzles such as to draw the opposed walls 6 of the tube apart adjacent the slit 19, one against each nozzle 25, as shown in Figure 1, and thereby form an opening through the slit into the partially completed package for the deposit of the substance from the spout 22. In timed relation to the movement of the tube 4 and as each split in the tube becomes located adjacent and beneath the spout 22, a predetermined quantity of the substance 26 to be packaged is deposited by gravity between the spread-apart walls 6 of the tube. Any suitable means for controlling the deposit of the substance may be utilized, but for purposes of illustration I have shown schematically a normally spring closed valve 27 that is opened periodically in timed relation to the movement of the tube 4 by a lug on an actuating disk 28 that may be driven in any suitable manner.

After the substance has been deposited, the tube moves between a second set of crimping and sealing rolls 29 that may be identical with the rolls 9 and which seal the walls of the tube 4 transversely in zones 30 closely adjacent but below the slit 19 through which the package is filled so as to complete the package B.

It is desirable that some means be provided for positively causing longitudinal movement of the tube 4 from the feed rolls and past the filling station at the mouth of the spout 22, and for this purpose I have shown two brushes 31 rotatably mounted on parallel axes and frictionally engaging opposite sides of the filled portion of the package tube 4 below the crimping rolls 29, said brushes being constantly driven by any suitable means.

In this way, a continuous chain or strip of packages is formed, and this package strip can be severed into groups of packages or individual packages as may be desired. As shown, I have provided a pair of severing rolls 32 that are driven in any suitable manner and sever the package strip between the individual packages, preferably along the respective slits 19.

Figures 6-10, inclusive, show a modification of the invention wherein the tube 4 of packaging material is pulled from the spool 3 by combined feeding, crimping and sealing rolls 33 which have crimping and sealing ribs 34 corresponding to the ribs 11 of the rolls 9 between which the peripheries of the rolls have sponge rubber portions 35 to firmly grip the tube of packaging material. These rolls 33 crimp and seal the side walls of the tube together just as do the rolls 9 to form transverse sealed zones 36, and after this sealing operation the side walls of the tube are slit, as indicated at 37, by slitting rolls 38 that may be in general the same as the slitting rolls 16 but have their knife blades 39 modified to form the slits 37 which extend across a portion of the width of the tube 4 and through one edge thereof, instead of slits like the slits 18.

Figures 6, 7, 8, 9, 10:
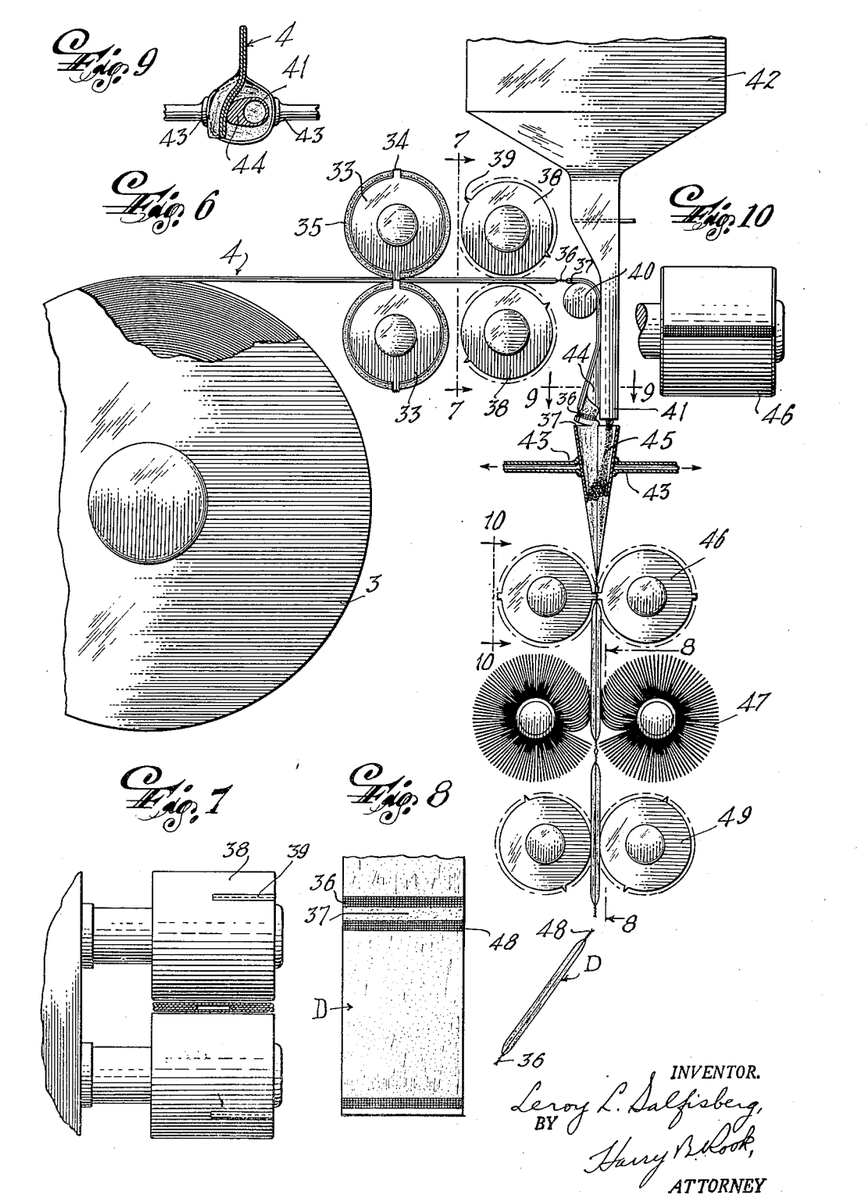
Figure 6 is a view similar to Figure 1, showing a modification of the invention.
Figure 7 is an enlarged vertical sectional view, on the plane of the line 7—7 of Figure 6.
Figure 8 is an elevational view of a completed package before severance thereof from the tube, approximately from the plane of the line 8—8 of Figure 6.
Figure 9 is an enlarged horizontal sectional view, approximately on the plane of the line 9—9 of Figure 6.
Figure 10 is a side elevational view of one of the sealing rollers, from the plane of the line 10—10 of Figure 6.

From the slitting rolls the packaging tube passes over an idler roller 40 and then downwardly alongside a depositing spout 41 of a hopper 42 for the substance to be packaged. When each slit 37 is disposed closely adjacent but below the discharge end of the spout 41, the side walls of the tube are pulled apart by vacuum tubes 43 that correspond to the vacuum tubes 24, and at the same time, the portion of the tube 4 of packaging substance above the slit is deflected away from the discharge end of the spout by a suitable deflector fin or lug 44 on the side of the spout, as best shown in Figure 9, so that the substance 45 being packaged may be deposited into the package through the opening formed by the slit 37 without obstruction from the portion of the tube 4 above the slit. The deposit of the substance into the package may be controlled in any suitable manner, for example as described in connection with the machine shown in Figure 1.

After the package has been filled, the tube is pulled downwardly through a second set of crimping and sealing rolls 46 by auxiliary feeding means that may constitute brushes 47 like the brushes 31. The rolls 46 seal the side walls of the tube together throughout the width of the tube in zones 48 so as to complete the packages D, and these packages may be severed from the package strip as desired, for example, by severing rolls 49, preferably along the respective slits 37 and between the top seal 48 of one package and the bottom seal 36 of the next succeeding package.

Figures 11, 12, 13, 14:
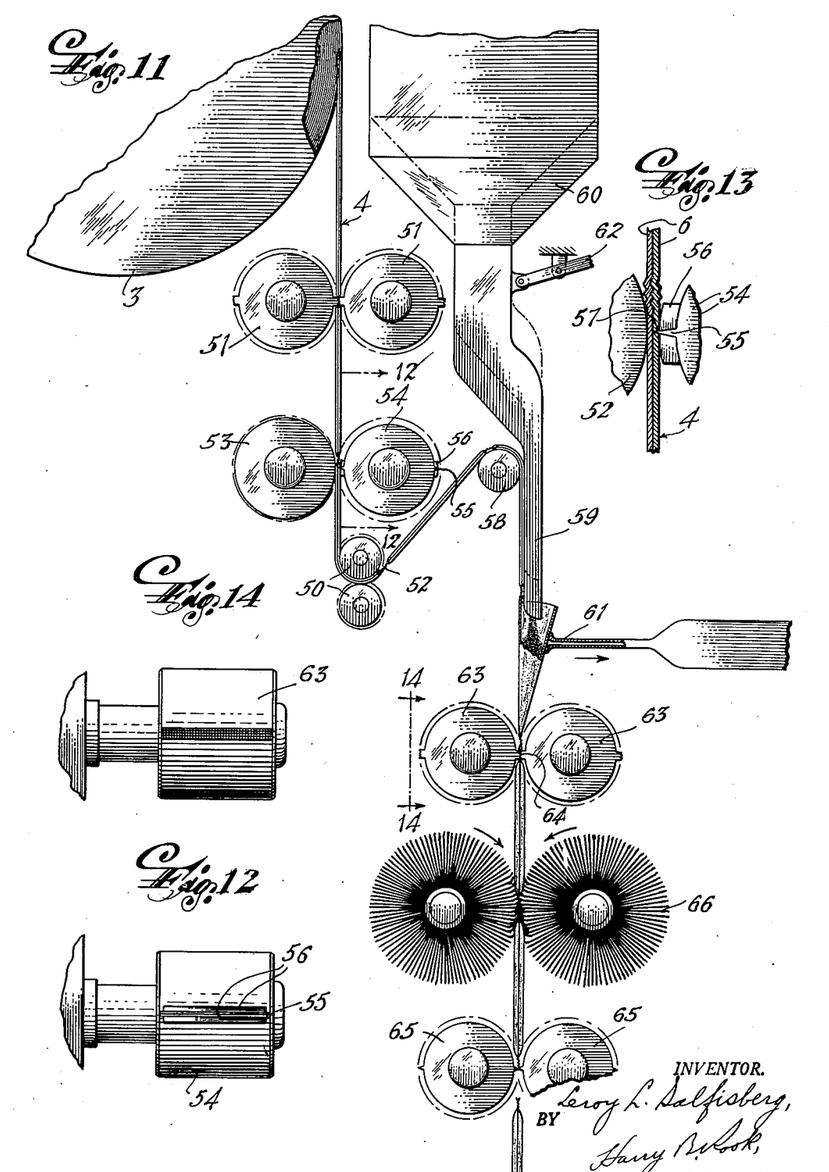
Figure 11 is a fragmentary front elevational view of another form of the machine embodying the invention.
Figure 12 is a side elevational view, approximately from the plane of the line 12—12 of Figure 11.
Figure 13 is an enlarged fragmentary end elevational view of the slitting rollers, showing the wall of the tube in cross-section therebetween to illustrate the manner of slitting one wall of the tube.
Figure 14 is a side elevational view, from the plane of the line 14—14 of Figure 11.

In Figures 11–14, inclusive, is shown another form of machine and method embodying the invention. Here, the tube 4 of packaging material is pulled from the spool 3 by feeding rolls 50 like the rolls 7, between initial crimping rolls 51 like the rolls 9 that seal the side walls of the tube 4 together in transverse zones 52 across the whole width of the tube. In this form of the invention, only one side wall of the tube is slit, instead of both side walls, and as shown, the initially sealed tube is pulled downwardly between slitting rolls 53 and 54 one of which, namely the roll 53, serves as a platen engaging one side of the tube 4 while the other roll has a blade 55 at opposite sides of which are platen bars 56 whose outer surfaces are disposed inwardly from the knife edge a distance approximately equal to the thickness of one wall of the tube 4, as best shown in Figure 13. In operation, as the tube walls 6 pass between the rolls 53 and 54, the knife blade 55 is pressed against the juxtaposed tube wall 6 but penetration of the blade into said wall is limited by the platen bars 56 so as to form a slit 57 in only said one wall of the tube.

After the tube 4 has been slit it passes over an idler roller 58 and then downwardly alongside a depositing spout 59 of a hopper 60 for the substance being packaged. As each slit in the package tube becomes disposed adjacent the discharge end of the spout 59, the slitted wall of the package tube is separated from the other wall by a vacuum tube 61 similar to one of the tubes 24, whereupon the substance being packaged is deposited from the spout 59 through the opening formed by the slit into the partially completed package.

Figures 15, 16, 17, 18:
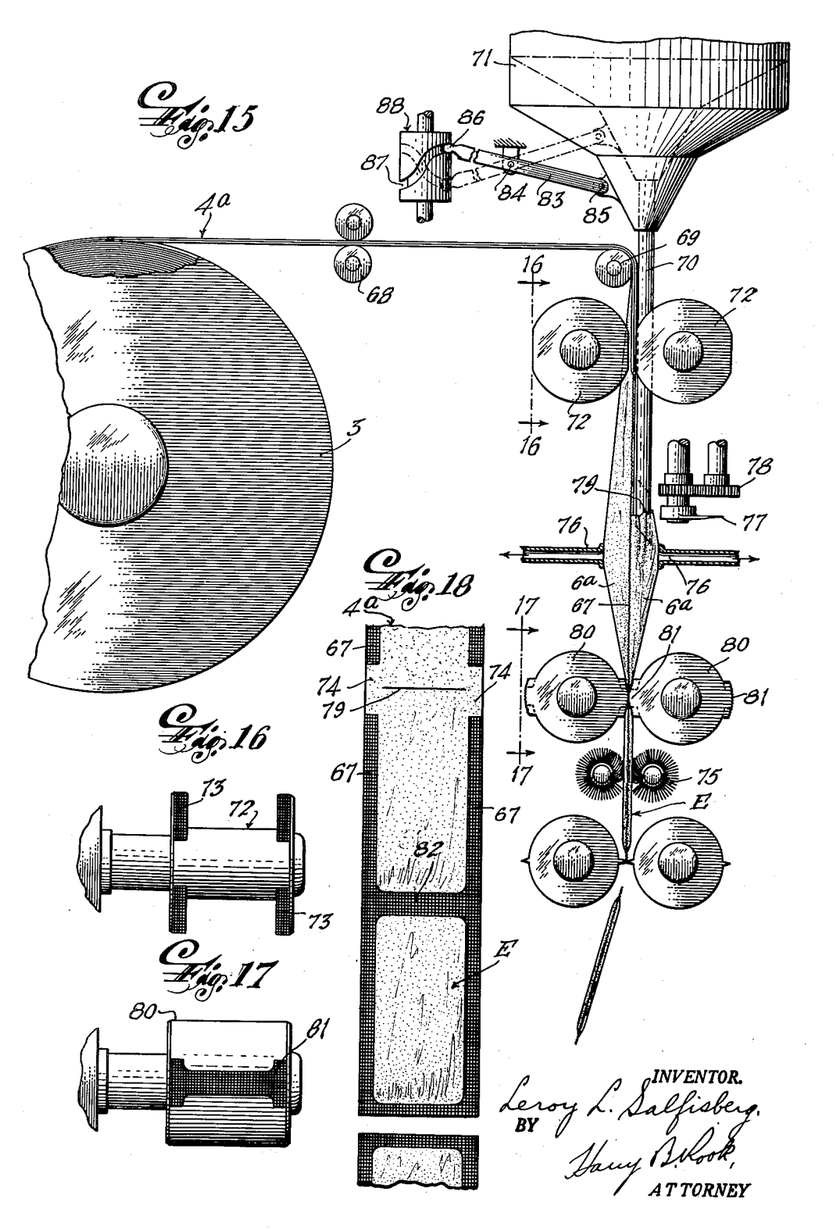
Figure 15 is a view similar to Figure 14, showing a further modification of the invention.
Figures 16 and 17 are side elevational views, from the planes of the lines 16—16 and 17—17, respectively, of Figure 15.
Figure 18 is a plan view of the tube of packaging material, showing a partially completed package and a completed package.

Any suitable means may be provided for controlling the deposit of the substance being packaged, for example, those hereinbefore described. However, in some instances it may be desirable to actually insert the discharge end of the depositing spout into the partially completed package, for example, to restrict the escape of dust or powdered substance from the package during the filling operation. For this purpose, the hopper and spout may normally be in the position shown in dot and dash lines in Figure 11 until after the walls of the partially completed package have been pulled apart, whereupon the spout alone or the spout with the hopper may be lowered through the opening formed by the slit and partially into the package, as shown by solid lines in Figure 11. The movement of the spout and hopper may be effected in any suitable manner as by a lever 62 operated by a cam such as shown in Figures 15–17, inclusive, or any other suitable means. It will be understood by those skilled in the art that instead of moving the hopper with the spout, the spout might be slidably connected to the hopper and moved independently of the hopper.

After the substance has been deposited in the package, the package strip passes through crimping and sealing rolls 63 like the rolls 29 to form the final seal 64 for completing the package, and then the groups or individual packages may be separated from the strip by severing rolls 65.

As shown, preferably auxiliary feeding means such as the brushes 66 are utilized for pulling the package strip downwardly past the filling station and final sealing rolls 63.

Figures 15–18, inclusive, show a modification of the invention wherein the package tube 4a is a plain tube without gussets or longitudinal folds, and the tube has its side walls 6a sealed together along its longitudinal edges in zones 67. If desired, the tube might be formed of two separate strips of packaging material having their longitudinal marginal portions sealed together to form the zones 67. The packaging material is pulled from the reel 3 by feed rolls 68 and passes around an idler roller 69 downwardly along and closely adjacent a depositing spout 70 of a hopper 71 for the substance being packaged.

At opposite sides of the spout 70 and of the packaging material are cooperating sealing and crimping rolls 72 which have segmental peripheral sealing and crimping flanges 73 to form the longitudinal sealed zones 67 and leave unsealed portions 74 between the adjacent ends of successive zones 67, as best shown in Figure 18. From the sealing rolls 72 the package tube is pulled downwardly by auxiliary feeding means such as the brushes 75 between opposed suction nozzles 76 like the nozzles 24 which pull apart the walls of the package tube, as shown in Figure 15. Immediately above the nozzles 76 is a slitting knife 77 that is rotatable in a horizontal plane by suitable gearing 78 in timed relation to the movement of the package tube so that the knife will slit one wall of the distended package tube, as indicated at 79.

Then the depositing spout 70 alone or with the hopper 71 is lowered so as to project the end of the spout through the slit 79 and between the walls of the package tube, as shown by solid lines in Figure 15. Simultaneously with or prior to the lowering of the spout, the walls of the package tube are sealed together below the slit by sealing rolls 80 that have portions 81 to form transverse sealed zones 82 extending across the package tube and meeting or slightly overlapping the longitudinal zones 67, as best shown in Figures 17 and 18. As shown, these transverse zones 82 form the bottom seal of one package and simultaneously seal the top of the next preceding package at opposite sides of each slit 79 so that one package E is completed simultaneously with the formation of the bottom seal of the next succeeding package. Preferably, the packages are severed from the strip along the slits 79.

Any suitable means may be utilized for raising and lowering the discharge spout 70, but I have schematically shown a lever 83 pivotally connected intermediate its ends on a fixed support 84 and pivotally connected at one end at 85 to the spout and hopper. The other end of the lever has a ball 86 which follows a cam groove 87 in an actuating cam 88 that is driven in any suitable manner in timed relation to the movement of the package tube 4. Normally, the spout is located in the position shown by broken lines in Figure 15, and after each slit has been formed in the package tube, the spout is lowered through said slit, as shown by solid lines in Figure 15. The discharge of the substance from the spout may be controlled in any suitable manner, for example, as shown in Figure 1.

Figures 19, 20, 21:
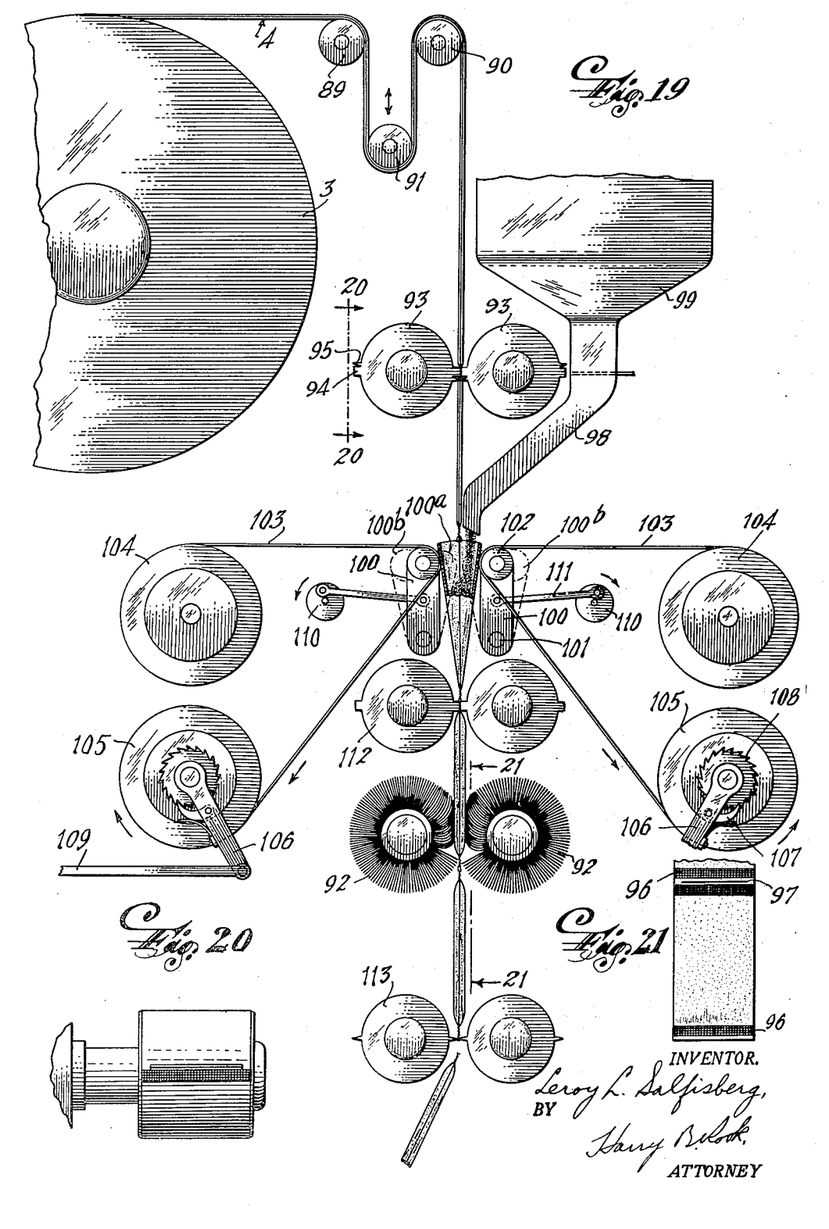
Figure 19 is a front elevational view of a machine embodying another modification of the invention.
Figure 20 is an enlarged side elevational view, from the plane of the line 20—20 of Figure 19.
Figure 21 is a fragmentary plan view of the tube of packaging material, showing a portion of an incomplete package and another completed package, approximately from the plane of the line 21—21 of Figure 19.

The invention also contemplates the use of other means than the suction nozzles for separating the slitted walls of the package tube, and Figures 19-21, inclusive, schematically illustrate a machine of this type. Here, the package tube 4 is drawn from the spool 3 by any suitable feeding mechanism, for example, mechanism of the type shown in my copending application Serial No. 673,394, filed May 31, 1946, now Patent Number 2,512,216, granted June 20, 1950, which includes two idler rollers 89 and 90 between which is a vertically movable feeding roller 91 and with which cooperates auxiliary feeding means such as the brushes 92 for constantly pulling the package tube from the main feeding means 89, 90, 91, whereby when the package tube is held against movement at or beyond the roller 90 and the roller 91 is moved downwardly, a predetermined quantity of the package tube is pulled from the spool 3, and when the roller 91 moves upwardly and the tube is released for movement at or beyond the roller 90, the auxiliary feeding means 92 will pull said predetermined quantity downwardly.

The tube is fed through combined sealing and slitting rolls 93 that have sealing ribs 94 and closely disposed slitting knives 95 whereby to form a sealed zone 96 extending entirely across the tube and to simultaneously form a slit 97 that extends only through an intermediate portion of the width of the package tube, as shown in Figure 21.

From the sealing and slitting rolls 93, the package tube is drawn downwardly by the brushes 92 past and beneath a depositing spout 98 of a hopper 99 for the substance being packaged. At opposite sides of the package tube and below the spout is disposed separating mechanism for the walls of the package tube. This mechanism is shown as comprising two identical levers 100, one at each of opposite sides of the package tube and pivoted at one end on a fixed support, as indicated at 101. At the free end of each lever is a roller 102 over which passes an adhesive-carrying tape 103 which is pulled step by step from a supply roll 104 by a roll 105 which is actuated step by step in any suitable manner as by means of a pawl lever 106 which carries a spring pawl 107 cooperating with a ratchet 108 on the end of the roll 105, the lever 106 being connected by a link 109 to any suitable source of power. A pressure-sensitive adhesive is disposed on both sides of the tapes 103 so that when the levers 100 are pressed toward each other and into contact with the walls of the package tube 4, as shown by broken lines 100a, the adhesive will adhere to said walls and the rollers 102, and upon movement of said levers in the opposite direction the walls of the package tube below the slit will be pulled apart, as shown by solid lines, so as to permit deposit of the substance to be packaged from the spout 98; and thereafter the levers will be further moved in the same direction, as indicated by broken lines 100b, to pull the tape out of contact with the walls of the package tube. Any suitable means may be used for oscillating the levers 100, but I have shown crank disks 110 connected by links 111 to the respective levers.

With this construction, it will be observed that fresh zones of the adhesive tapes 103 will be presented as required for efficient adhesive contact of the tape with the packaging material. During the deposit of the substance into the partially completed package, the slitted end of the previously filled package is sealed by rolls 112 that correspond in structure and function to the rolls 29 and seal the package in the same way, and thereafter the packages may be severed from the package strip by severing rolls 113.

Figures 22, 23:
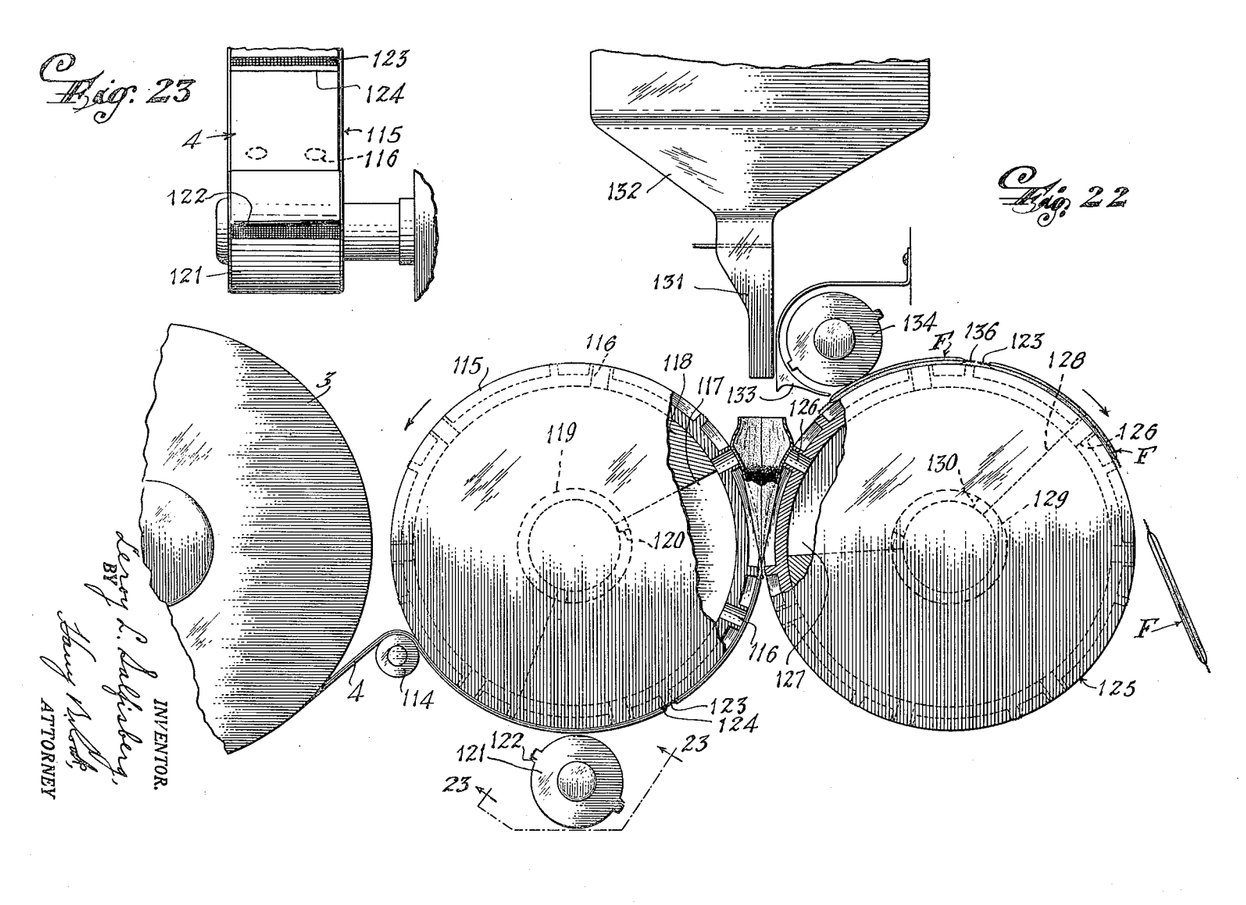
Figure 22 is a side elevational view of another form of machine embodying the invention.
Figure 23 is a fragmentary side elevational view, approximately from the plane of the line 23—23 of Figure 22.

In Figures 22 and 23 is shown another method and machine embodying my invention wherein the package tube 4 passes between a feed roll 114 and a horizontal hollow drum 115 and thence around the lower portion of the drum in contact with which the tube is held by suction applied through openings 116 in the peripheral wall of the drum from a suction chamber 117 that is formed between the peripheral wall of the drum and a valve block 118 which is connected to a tubular shaft 119 that is in turn connected to a suction-producing apparatus. As shown, the valve block 118 is cut away to form the vacuum chamber and the shaft 119 has an arcuate slot 120 for establishing communication between the vacuum chamber and the interior of the shaft. The suction chamber 117 is coextensive with the portion of the periphery of the drum from approximately a vertical diametral plane of the drum to a point substantially above the horizontal diametral plane, so that the suction continuously applied through the shaft 119 will hold the package tube 4 in snug contact with the periphery of the drum while the openings 116 in the drum that underlie the package tube are in communication with the suction chamber. The valve block prevents communication of said openings 116 with the suction chamber throughout the remainder of the periphery of the drum.

While the package tube is carried by the drum 115, the opposed walls thereof are sealed together transversely by a sealing roll 121 that also has severing blades 122 for slitting the package tube transversely adjacent the sealed zones 123, as indicated at 124, into sections of package length.

After the package tube has been slitted, it is carried on the drum 115 upwardly between said drum and a similar drum 125 that has openings 126 in its periphery like the openings 116 which communicate with a suction chamber 127 formed within the drum by a valve block 128, said suction chamber communicating with the suction-producing apparatus hereinbefore mentioned through an arcuate slot 129 in a tubular shaft 130 on which the drum 125 is rotatably mounted. The suction chamber 128 is coextensive with the upper portion of the drum 125 from slightly below the horizontal diametral plane thereof to a point substantially beyond the vertical diametral plane so that the openings at said upper portion of the drum communicate with the suction chamber, the valve block 128 preventing communication of the openings 126 with the suction chamber throughout the remainder of the circumference of the drum.

The feed roll 114 and drums 115 and 125 being rotated in the directions indicated by the arrows by any suitable means, the package tube is first transversely sealed and slit by the roll 121 and then as the slitted tube is carried upwardly between the drums 115 and 125 and above the horizontal diametral plane thereof, the side walls of the package tube will be pulled apart by suctional adherence of said walls to the peripheries of said drums, so as to form an opening at the upper end of the partially completed package. Thereupon, the substance to be packaged is deposited into the package through the open end thereof by the depositing spout 131 of the hopper 132 for the substance being packaged, the deposit of said substance being controlled by any suitable means such as that shown in Figure 1. Then continued rotation of the drums interrupts the suctional adherence of the wall of the package to the drum 115 while the drum 125 carries the package upwardly beneath a closing blade 133 which presses the edge portions of the walls at the open end of the package together, whereupon said edge portions pass between another sealing roll 134 and the periphery of the drum 125 which forms a sealed zone 136 across the previously open end of the package to complete the package F. Then, as the drum 125 continues to rotate, the valve block 128 interrupts the influence of the suction on the package to permit the latter to drop by gravity from the drum.

It will be understood that the openings 116 and 126 in the drum will be properly circumferentially spaced according to the length of the packages being made, and as shown, there is one opening in each drum for each package.

While I have shown and described several embodiments of the method and apparatus of the invention, it should be understood that this is primarily for the purpose of explaining the principles of the invention and that many modifications and changes can be made in the steps of the method and in the structure of the machine within the spirit and scope of the invention.

Having thus described the invention, what I claim is:

1. A method of filling packages, comprising feeding vertically longitudinally a tube of flexible packaging material having opposed wall portions, sealing the tube in a transverse zone, slitting at least a portion of the wall of the tube transversely above said transverse zone to form a filling opening while maintaining the integrity of the tube, depositing through said filling opening a substance to be packaged, and closing said opening to complete the package.

2. A method of filling packages, comprising feeding vertically longitudinally a tube of flexible packaging material having opposed wall portions, sealing the tube in a transverse zone, pulling said opposed portions of the tube walls into spaced relation to each other and slitting one wall portion transversely intermediate its longitudinal edges above said sealed zone to form a filling opening while maintaining the integrity of the tube, while said walls are held in spaced relation depositing a substance to be packaged through said opening, and closing said opening to complete the package.

3. A machine for making and filling packages comprising means for feeding vertically longitudinally a tube of flexible packaging material having opposed wall portions, means for sealing said tube transversely in zones spaced longitudinally of the tube, means for slitting at least a portion of the walls of the tube transversely above each said transverse zone and for forming a filling opening at the slit while maintaining the integrity of the tube, depositing through said filling opening a substance to be packaged and closing said opening to complete the package.

4. A method of making and filling packages comprising feeding a tube of flexible packaging material longitudinally in substantially flat condition, sealing said tube transversely in zones spaced longitudinally of the tube, slitting at least a portion of the walls of the tube transversely adjacent each sealed zone while maintaining the integrity of the tube, flexing the walls of said tube adjacent each slit to form a filling opening, while said walls are so flexed depositing through said opening a substance to be packaged, and closing said opening.

5. A method of making and filling packages comprising feeding a tube of flexible packaging material longitudinally in substantially flat condition, sealing said tube transversely in zones spaced longitudinally of the tube, slitting at least a portion of the walls of the tube transversely adjacent each sealed zone while maintaining the integrity of the tube, flexing the walls of said tube adjacent each slit to form a filling opening, while said walls are so flexed depositing through said opening a substance to be packaged, and sealing said tube between each said opening and the remoter one of two of said sealed zones next adjacent said opening.

6. A method of making and filling packages comprising feeding a tube of flexible packaging material longitudinally in substantially flat condition, sealing said tube transversely in zones spaced longitudinally of the tube, slitting at least a portion of the walls of the tube transversely at one side of and adjacent each sealed zone while maintaining the integrity of the tube, gripping the outside surface of at least one of said opposed walls at said side of the sealed zone adjacent said slit and pulling and holding it away from the other wall to form a filling opening at said slit between said walls, while so holding said wall depositing through said opening a substance to be packaged, and closing said opening.

7. A method as defined in claim 4, wherein both of said walls are slit.

8. A method as defined in claim 4, wherein both of said walls are slit intermediate the longitudinal edges of said tube.

9. A method as defined in claim 4, wherein both of said walls are slit intermediate the longitudinal edges of said tube and both of said walls are gripped and each pulled away from the other to form the filling opening.

10. A method as defined in claim 4, wherein both of said walls are slit inwardly from one longitudinal edge of said tube to a point short of the opposite edge, both of said walls are gripped and are pulled apart to form the filling opening, with the additional step of laterally deflecting away from said opening the portion of the tube above said slit.

11. A method as defined in claim 4, wherein only one of said opposed walls is slit and said wall is flexed by gripping the outer surface thereof and pulling the wall away from the other wall.

12. A machine for making and filling packages, comprising means for feeding longitudinally a flattened tube of flexible packaging material having opposed wall portions, means for sealing said tube transversely in zones spaced longitudinally of the tube, means for slitting at least a portion of the walls of the tube transversely at one side of and adjacent each sealed zone and for maintaining the integrity of the tube, means for flexing the opposed wall portions of said tube at said side of said sealed zone adjacent each slit to form a filling opening, means for depositing through said opening a substance to be packaged, and means for closing said opening to complete the package.

13. A machine for making and filling packages, comprising means for feeding longitudinally a flattened tube of flexible packaging material having opposed wall portions, means for sealing said tube transversely in zones spaced longitudinally of the tube, means for slitting at least a portion of the walls of the tube transversely adjacent each sealed zone and for maintaining the integrity of the tube, means for gripping the outside surface of at least one of said opposed wall portions at said side of said sealed zone adjacent the slit and pulling it away from the other wall portion to form a filling opening therebetween, means for depositing through said opening a substance to be packaged, and means for sealing together said walls of the tube between each said opening and the remoter one of two of said sealed zones next adjacent said opening.

14. A machine as defined in claim 3 wherein the means for pulling the opposed portions of the tube walls into spaced relation comprises at least one element having an adhesive surface movable in opposite directions to adhesively contact with one wall portion upon movement in one direction and to move said wall with said element upon movement thereof in the other direction.

LEROY L. SALFISBERG.

REFERENCES CITED

The following references are of record in the file of this patent:

UNITED STATES PATENTS

| Number | Name | Date |
| --- | --- | --- |
| 762,275 | Bowden | June 14, 1904 |
| 1,800,657 | Pelletier | Apr. 14, 1931 |
| 2,051,483 | Jones | Aug. 18, 1936 |
| 2,320,326 | Avery | May 25, 1943 |
| 2,482,609 | Berch | Sept. 20, 1949 |